(12) United States Patent
Mizutani et al.

(10) Patent No.: US 7,883,757 B2
(45) Date of Patent: Feb. 8, 2011

(54) RESIN COMPOSITION FOR OPTICAL DISK AND CURED PRODUCT THEREOF

(75) Inventors: Go Mizutani, Tokyo (JP); Kiyohisa Tokuda, Tokyo (JP); Masahiro Naitou, Tokyo (JP); Hideaki Kametani, Tokyo (JP); Kikuo Imazumi, Tokyo (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 623 days.

(21) Appl. No.: 11/921,253

(22) PCT Filed: Jun. 15, 2006

(86) PCT No.: PCT/JP2006/311999

§ 371 (c)(1),
(2), (4) Date: Nov. 29, 2007

(87) PCT Pub. No.: WO2006/134990

PCT Pub. Date: Dec. 21, 2006

(65) Prior Publication Data
US 2009/0081437 A1 Mar. 26, 2009

(30) Foreign Application Priority Data
Jun. 17, 2005 (JP) ............................. 2005-177089

(51) Int. Cl.
*B32B 3/02* (2006.01)
(52) U.S. Cl. ..................................... 428/64.4; 428/65.1
(58) Field of Classification Search ................ 428/64.4, 428/65.1; 522/100, 103; 525/455, 460, 528, 525/529, 533, 922
See application file for complete search history.

(56) References Cited

U.S. PATENT DOCUMENTS

| | | | | |
|---|---|---|---|---|
| 3,373,221 A | * | 3/1968 | May | 528/80 |
| 3,876,432 A | * | 4/1975 | Carlick et al. | 522/97 |
| 4,205,018 A | * | 5/1980 | Nagasawa et al. | 525/404 |
| 4,224,357 A | * | 9/1980 | Iwai et al. | 427/507 |
| 4,295,947 A | * | 10/1981 | Ohtani et al. | 522/103 |
| 4,981,743 A | * | 1/1991 | Ho | 428/65.1 |
| 5,714,222 A | * | 2/1998 | Yokoyama | 428/64.1 |

FOREIGN PATENT DOCUMENTS

| | | |
|---|---|---|
| JP | 3-131605 | 6/1991 |
| JP | 3-172358 | 7/1991 |
| JP | 5-59139 | 3/1993 |
| JP | 5-132534 | 5/1993 |
| JP | 6-136086 | 5/1994 |
| JP | 11-273147 | 10/1999 |
| JP | 2001-33960 | 2/2001 |
| JP | 2003-155320 | 5/2003 |
| JP | 2003-268067 | 9/2003 |
| JP | 2003-268263 | 9/2003 |
| JP | 2004-196984 | 7/2004 |

* cited by examiner

*Primary Examiner*—Mark Ruthkosky
*Assistant Examiner*—Gerard T Higgins
(74) *Attorney, Agent, or Firm*—Nields, Lemack & Frame, LLC

(57) ABSTRACT

Disclosed is an ultraviolet-curable resin composition containing a polyurethane compound (A), a photopolymerization initiator (B), and an ethylenically unsaturated compound (C) other than the compound (A). The polyurethane compound (A) is obtained by reacting an epoxycarboxylate compound (c), which is obtained by reacting an epoxy compound (a) having two or more epoxy groups in a molecule with a monocarboxylic acid compound (b) having an ethylenically unsaturated group in a molecule, with a diisocyanate compound (d).

8 Claims, No Drawings

RESIN COMPOSITION FOR OPTICAL DISK AND CURED PRODUCT THEREOF

TECHNICAL FIELD

The present invention relates to an ultraviolet-curable resin composition for optical disks, and a cured product thereof. Particularly, the present invention relates to a next-generation high-density optical disk which is low in water absorption and cure shrinkage of the cured product and excellent in transparency and durability.

BACKGROUND ART

Optical disk recording media which are now put to practical use are CD (compact disk), MO (magneto-optical disk), CD-R (recordable compact disk), CD-RW (rewritable compact disk), etc. In these recording media, a recording film and a reflective film are formed on a polycarbonate substrate of 1.2 mm thick, and a protective layer comprising an ultraviolet-curable coating agent is provided for the purpose of protecting the above films from external causes. Recently, for further improvement of storage capacity, a recording medium has been developed which comprises two laminated substrates with the thickness of the polycarbonate being 0.6 mm which is half the thickness in conventional recording media. By employing such a construction, there are practically used DVD-R, DVD-RW, DVD-RAM, DVD+R, DVD+RW, etc. which have solved the problems of birefringence of polycarbonate substrates and reduction of laser spot diameter. In all of these recording media, a recording film, a reflective film, and the like are formed on a polycarbonate substrate of 0.6 mm, and an ultraviolet-curable protective layer or adhesive layer is provided for the purpose of protection or adhesion as mentioned above.

However, DVD recording media are still insufficient in capacity as recording media for attaining large capacity in the times of digital broadcasting. Thus, optical disks comprising a substrate on which a recording layer and a transparent layer of 100 μm are laminated are proposed and practically used as the next-generation high-density optical disks (Patent Document 1). In these optical disks, writing and reading are carried out with blue laser beams from the transparent cover layer side, and not from the polycarbonate substrate side.

The methods for forming the cover layer includes a method of laminating a transparent layer of 100 μm and a method of forming a layer of 100 μm on the recording layer using an ultraviolet-curable resin. For the formation of the ultraviolet-curable resin layer, 2P method and a spin coating method are proposed. As the ultraviolet-curable resin formed on the recording film, there are proposed, for example, 2P agents such as compositions disclosed in Patent Document 2 and Patent Document 3. Furthermore, there are proposed protective coating agents such as compositions disclosed in Patent Document 4, Patent Document 5 and Patent Document 6.

Patent Document 1: JP-A-11-273147
Patent Document 2: JP-A-5-059139
Patent Document 3: JP-A-5-132534
Patent Document 4: JP-A-3-131605
Patent Document 5: JP-A-3-172358
Patent Document 6: JP-A-2003-268263

DISCLOSURE OF INVENTION

Problem to be Solved by the Invention

However, the conventional ultraviolet-curable resin compositions are high in cure shrinkage. Therefore, if these resin compositions are used as the transparent cover layer of high-density optical disks for a long time, a large warpage occurs (insufficiency in durability).

Means for Solving the Problem

As a result of intensive research conducted by the inventors, a resin composition suitable for solving the above problems has been found.

That is, the present invention has the following attributes.

(1) A resin composition for optical disks, comprising: a polyurethane compound (A) produced by reacting an epoxycarboxylate compound (c), which is produced by reacting an epoxy compound (a) having two or more epoxy groups in a molecule with a monocarboxylic acid compound (b) having an ethylenically unsaturated group in a molecule, with a diisocyanate compound (d); a photopolymerization initiator (B); and an ethylenically unsaturated compound (C) other than the compound (A).

(2) The resin composition for optical disks described in the above (1) which is a protective coating agent for optical disk.

(3) A cured product produced by curing the resin composition for optical disks described in the above (1) or (2).

(4) The cured product described in the above (3) which has a water absorption measured at 25° C. of 2.0% or lower and a cure shrinkage of 6% or lower.

(5) The cured product described in the above (3) or (4) which has a transmittance of 70% or higher for blue laser of a wavelength of 405 nm at a film thickness of 100±10 μm of the cured product.

(6) An optical disk having a layer of the cured product described in any one of the above (3)-(5).

(7) The optical disk described in the above (6) having a layer of the cured product on the incidence side of a recording light and/or a reproducing light.

Advantages of the Invention

According to the present invention, it has become possible to provide a resin composition as a protective coating agent for high-density optical disks which is excellent in transparency and water absorption, less in warpage and high in durability, and a cured product thereof. The resin composition and cured product thereof are very useful for optical disks in which reading and/or writing are carried out using blue laser beams.

BEST MODE FOR CARRYING OUT THE INVENTION

As mentioned above, the present invention provides a protective coating agent for high-density optical disks which is excellent in transparency and water absorption, less in warpage and high in durability, and a cured product thereof. In addition, the resin composition and cured product thereof of the present invention can also be applied to materials for optical uses such as optical fibers and optical switching elements. The present invention will be explained in detail below.

The resin composition for optical disks according to the present invention contains a polyurethane compound (A) produced by reacting an epoxycarboxylate compound (c) with a diisocyanate compound (d), the compound (c) being produced by reacting an epoxy compound (a) having two or more epoxy groups in a molecule with a monocarboxylic acid compound (b) having an ethylenically unsaturated group in a molecule; a photopolymerization initiator (B); and an ethylenically unsaturated compound (C) other than the compound (A).

The polyurethane compound (A) used in the resin composition of the present invention is produced by reacting an epoxycarboxylate compound (c) with a diisocyanate compound (d), the compound (c) being produced by reacting an epoxy compound (a) having two or more epoxy groups in the molecule with a monocarboxylic acid compound (b) having an ethylenically unsaturated group in the molecule.

As the epoxy compound (a) having two or more epoxy groups in the molecule used in the present invention, mention may be made of, for example, phenyldiglycidyl ethers such as hydroquinonediglycidyl ether, catecholdiglycidyl ether and resorcinoldiglycidyl ether; bisphenol type epoxy compounds such as bisphenol A type epoxy resin, bisphenol F type epoxy resin, bisphenol S type epoxy resin and epoxy compound of 2,2-bis(4-hydroxyphenyl)-1,1,1,3,3,3-hexafluoropropane; hydrogenated bisphenol type epoxy compounds such as hydrogenated bisphenol A type epoxy resin, hydrogenated bisphenol F type epoxy resin, hydrogenated bisphenol S type epoxy resin and epoxy compound of hydrogenated 2,2-bis(4-hydroxyphenyl)-1,1,1,3,3,3-hexafluoropropane; halogenated bisphenol type epoxy compounds such as brominated bisphenol A type epoxy resin and brominated bisphenol F type epoxy resin; alicyclic diglycidyl ether compounds such as EO/PO-modified bisphenol type epoxy resin and cyclohexanedimethanoldiglycidyl ether compound; aliphatic diglycidyl ether compounds such as 1,6-hexanedioldiglycidyl ether, 1,4-butanedioldiglycidyl ether and diethylene glycol diglycidyl ether; polysulfide type diglycidyl ether compounds such as polysulfide diglycidyl ether; biphenol type epoxy resins; polyether type epoxy resins; and the like.

Commercially available epoxy compounds (a) include, for example, bisphenol A type epoxy resins such as EPIKOTE 828, EPIKOTE 1001, EPIKOTE 1002, EPIKOTE 1003 and EPIKOTE 1004 (manufactured by Japan Epoxy Resin Co., Ltd.), EPOMIC R-140, EPOMIC R-301 and EPOMIC R-304 (manufactured by Mitsui Chemical Co., Ltd.), DER-331, DER-332 and DER-324 (manufactured by Dow Chemical Co., Ltd.), EPIKRON 840 and EPIKRON 850 (manufactured by Dainippon Ink & Chemicals Inc.), UVR-6410 (manufactured by Union Carbide Corp.), and YD-8125 (manufactured by Toto Kasei Co., Ltd.); bisphenol F type epoxy resins such as UVR-6490 (manufactured by Union Carbide Corp.), YDF-2001, YDF-2004 and YDF-8170 (manufactured by Toto Kasei Co., Ltd.), and EPIKRON 830 and EPIKRON 835 (manufactured by Dainippon Ink & Chemicals Inc.); hydrogenated bisphenol A type epoxy resins such as HBPA-DGE (manufactured by Maruzen Oil Co., Ltd.) and RIKARESIN HBE-100 (manufactured by Shinnihon Rika K.K.); brominated bisphenol A type epoxy resins such as DER-513, DER-514 and DER-542 (manufactured by Dow Chemical Co., Ltd.); PO-modified bisphenol A type epoxy resins such as EPOLITE 3002 (manufactured by Kyoeisha Chemical Co., Ltd.); alicyclic epoxy resins such as CELLOXIDE 2021 (manufactured by Daicel Ltd.), RIKARESIN DME-100 (manufactured by Shinnihon Rika K.K.) and EX-216 (manufactured by Nagase Kasei Co., Ltd.); aliphatic diglycidyl ether compounds such as ED-503 (manufactured by Asahi Denka Kogyo K.K.), RIKARESIN W-100 (manufactured by Shinnihon Rika K.K.), and EX-212, EX-214 and EX-850 (manufactured by Nagase Kasei Co., Ltd.); polysulfide type diglycidyl ether compounds such as FLEP-50 and FLEP-60 (manufactured by Toray Thiokol Co., Ltd.); biphenol type epoxy compounds such as YX-4000 (manufactured by Japan Epoxy Resin Co., Ltd.); and polyether type epoxy compounds such as EPOLITE 100E and EPOLITE 200P (manufactured by Kyoeisha Chemical Co., Ltd.).

As the monocarboxylic acid compound (b) having an ethylenically unsaturated group in the molecule which is used for producing the polyurethane compound (A) used in the resin composition of the present invention, there may be used any monocarboxylic acid compounds having an ethylenically unsaturated group in the molecule. Specific examples are acrylic acids, crotonic acid, α-cyanocinnamic acid, cinnamic acid or reaction products of saturated or unsaturated dibasic acids with unsaturated group-containing monoglycidyl compounds.

As the acrylic acids, mention may be made of, for example, (meth)acrylic acid, β-styrylacrylic acid, β-furfurylacrylic acid, half esters which are equimolar reaction products of saturated or unsaturated dibasic acid anhydrides and (meth) acrylate derivatives having one hydroxyl group in one molecule, half esters which are equimolar reaction products of saturated or unsaturated dibasic acids and monoglycidyl (meth)acrylate derivatives, etc. From the point of sensitivity of the compositions as photosensitive resin compositions, (meth)acrylic acid, reaction products of (meth)acrylic acid with ε-caprolactone, and cinnamic acid are especially preferred.

Furthermore, the epoxycarboxylate compound (c) obtained by reacting the epoxy compound (a) having two or more epoxy groups in a molecule with the monocarboxylic acid compound (b) having an ethylenically unsaturated group in a molecule may be a commercially available compound. The commercially available compounds include, for example, bisphenol type epoxy (meth)acrylates such as R-115 (manufactured by Nippon Kayaku Co., Ltd.), EPOXY ESTER 3000A and EPOXY ESTER 3000M (manufactured by Kyoeisha Chemical Co., Ltd.), and V#540 (manufactured by Osaka Yuki Kagaku Kogyo Co., Ltd.); aliphatic epoxy (meth)acrylates such as R-167 (manufactured by Nippon Kayaku Co., Ltd.); and polyether type epoxy (meth)acrylates such as EPOXY ESTER 40EM, EPOXY ESTER 70PA and EPOXY ESTER 200PA (manufactured by Kyoeisha Chemical Co., Ltd.).

Specific examples of the diisocyanate compound (d) are chain saturated hydrocarbon diisocyanates such as tetramethylene diisocyanate, hexamethylene diisocyanate, 2,2,4- or 2,4,4-trimethylhexamethylene diisocyanate, 1,12-dodecamethylene diisocyanate, and lysine diisocyanate; cyclic saturated hydrocarbon diisocyanates such as isophorone diisocyanate, dicyclohexylmethane diisocyanate, methylenebis(4-cyclohexyl isocyanate), hydrogenated diphenylmethane diisocyanate, hydrogenated xylene diisocyanate, hydrogenated toluene diisocyanate and norbornene diisocyanate; and aromatic diisocynates such as 2,4-tolylene diisocyanate, 1,3-xylylene diisocyanate, p-phenylene diisocyanate, 6-isopropyl-1,3-phenyl diisocyanate and 1,5-naphthalene diisocyanate. The diisocyanate compounds (d) are not limited to these examples. These may be used each alone or in admixture of two or more.

The polyurethane compound (A) used in the resin composition of the present invention is produced in the following manner. That is, first, an epoxycarboxylate compound (c) having an alcoholic hydroxyl group is produced by the reaction of the epoxy compound (a) having two or more epoxy groups in the molecule with the monocarboxylic acid compound (b) having an ethylenically unsaturated group in the molecule (hereinafter referred to as "first reaction"). Then, the epoxycarboxylate compound (c) is subjected to urethanation reaction with the diisocyanate compound (d) (hereinafter referred to as "second reaction"), whereby the polyurethane compound (A) can be obtained. When the commercially available epoxycarboxylate compound (c) mentioned above is used, it can be obtained only by the second reaction.

The first reaction can be carried out without using solvent or in a solvent having no alcoholic hydroxyl group. Specifically, the reaction can be carried out, for example, in one or mixed organic solvents of ketones such as acetone, methyl ethyl ketone and cyclohexanone; aromatic hydrocarbons such as benzene, toluene, xylene and tetramethylbenzene; glycol ethers such as ethylene glycol dimethyl ether, ethylene glycol diethyl ether, dipropylene glycol dimethyl ether, dipropylene glycol diethyl ether, triethylene glycol dimethyl ether and triethylene glycol diethyl ether; esters such as ethyl acetate, butyl acetate, methylcellosolve acetate, ethylcellosolve acetate, butylcellosolve acetate, carbitol acetate, propylene glycol monomethyl ether acetate, dialkyl glutarate, dialkyl succinate and dialkyl adipate; cyclic esters such as γ-butyrolactone; petroleum solvents such as petroleum ether, petroleum naphtha, hydrogenated petroleum naphtha and solvent naphtha; and, besides, ethylenically unsaturated compounds (C) mentioned hereinafter.

As to the charging ratio of the starting materials in the reaction, it is preferred that the amount of the monocarboxylic acid compound (b) having an ethylenically unsaturated group in the molecule is 0.8-1.2 equivalent amount per 1 equivalent amount of the epoxy group of the epoxy compound (a) having two or more epoxy groups in the molecule. If the ratio is outside the above range, there is the possibility of causing gelation in the second reaction.

In the first reaction, it is preferred to use a catalyst for acceleration of the reaction. The amount of the catalyst used is preferably 0.1-10% by weight based on the reactants. The reaction temperature is preferably 60-150° C. and the reaction time is preferably 5-60 hours. Specific examples of the catalyst used are triethylamine, benzyldimethylamine, triethylammonium chloride, benzyltrimethylammonium bromide, benzyltrimethylammonium iodide, triphenylphosphine, triphenylstibine, methyltriphenylstibine, chromium octanoate, zirconium octanoate, etc. Furthermore, it is preferred to use hydroquinone monomethyl ether, 2-methylhydroquinone, hydroquinone, diphenylpicrylhydrazine, diphenylamine, 3,5-ditertiary-butyl-4-hydroxytoluene, etc. as a thermal polymerization inhibitor. The first reaction is conducted while optionally carrying out sampling and terminated when oxidation of the sample reaches 1 mg·KOH/g or less, preferably 0.5 mg·KOH/g or less.

The second reaction is an urethanation reaction of the epoxycarboxylate compound (c) obtained after completion of the first reaction or the commercially available epoxycarboxylate compound (c) with diisocyanate compound (d) with gradually adding the diisocyanate compound (d). In the second reaction, as for the relationship of equivalents between the epoxycarboxylate compound (c) and the diisocyanate compound (d), they are charged in such a relationship of equivalents that all the isocyanate groups are lost after the reaction (the molar ratio OH group/NCO group >1). When the charging ratio is increased, concentration of the urethane bond decreases to cause reduction in characteristics as polyurethane compound. On the other hand, when the charging ratio is lowered, the molecular weight of the resulting polyurethane compound increases, and the operability is sometimes deteriorated due to the high viscosity. Specifically, the ratio is preferably such that NCO group of the diisocyanate compound (d) is in 0.1-0.9 mol per 1.0 mol of OH group of the epoxycarboxylate compound (c).

The second reaction can also be carried out without using solvent. Moreover, it can be carried out in one or mixed organic solvent of the above-mentioned solvents having no alcoholic hydroxyl group, and ethylenically unsaturated compounds (C) mentioned hereinafter. Moreover, the above thermal polymerization inhibitor may be further added.

The reaction temperature in the second reaction is usually 30-150° C., preferably 50-100° C. The end point of the reaction is confirmed by the decrease of the amount of isocyanate. Furthermore, a catalyst may be added for the purpose of reducing the reaction time. As the catalyst, either of a basic catalyst or an acidic catalyst is used. Examples of the basic catalyst are amines such as pyridine, pyrrole, triethylamine, diethylamine, dibutylamine and ammonia; phosphines such as tributylphosphine and triphenylphosphine; and the like. Examples of the acidic catalyst are Lewis acid catalysts such as copper naphthenate, cobalt naphthenate, zinc naphthenate, tributoxyaluminum, titanium tetraisopropoxide, zirconium tetrabutoxide, aluminum chloride, tin 2-ethylhexanoate, octyltin trilaurate, dibutyltin dilaurate and octyltin diacetate. The amount of these catalysts added is usually 0.001-0.1 part by weight based on 100 parts by weight in total of the epoxycarboxylate compound (c) and the diisocyanate compound (d). The compound (c) contributes to the low water absorption performance and the low shrinkage performance.

The content of the compound (A) in the resin composition of the present invention is usually 5-98% by weight, preferably 10-96% by weight.

Examples of the photopolymerization initiator (B) contained in the resin composition of the present invention are 1-hydroxycyclohexyl phenyl ketone (IRGACURE 184: manufactured by Ciba Specialty Chemicals Inc.), 2,2-dimethoxy-2-phenyl acetophenone (IRGACURE 651): manufactured by Ciba Specialty Chemicals Inc.), 2-hydroxy-2-methyl-1-phenyl-propane-1-one (DALOCURE 1173: manufactured by Ciba Specialty Chemicals Inc.), 2-methyl-1-[4-(methylthio)phenyl]-2-morpholinopropane-1-one (IRGACURE 907: manufactured by Ciba Specialty Chemicals Inc.), 2-benzyl-2-dimethylamino-1-(4-morpholinophenyl)-butane-1-one, 2-chlorothioxanthone, 2,4-dimethylthioxanthone, 2,4-diisopropylthioxanthone, isopropylthioxanthone, 2,4,6-trimethylbenzoyl-diphenylphosphine oxide, bis(2,6-dimethoxybenzoyl)-2,4,4-trimethylpentylphosphine oxide, etc. These photopolymerization initiators can be used each alone or in admixture of two or more at an optional ratio. These may be used in combination with photopolymerization initiation assistants such as amines.

The content of the photopolymerization initiator (B) in the resin composition of the present invention is usually 0.5-20% by weight, preferably 1-10% by weight.

Examples of the photopolymerization initiation assistants such as amines usable in the present invention are diethanolamine, 2-dimethylaminoethyl benzoate, dimethylaminoacetophenone, ethyl p-dimethylaminobenzoate, isoamyl p-dimethylaminobenzoate, etc. In the case of using the photopolymerization initiation assistant, the content thereof in the resin composition of the present invention is usually 0.05-5% by weight, preferably 0.1-3% by weight.

Examples of the ethylenically unsaturated compound (C) used in the resin composition of the present invention are acrylate monomers, acrylate oligomers, etc.

The acrylate monomers as the ethylenically unsaturated compound (C) can be classified into monofunctional monomers having one (meth)acrylate group in a molecule and polyfunctional monomers having two or more (meth)acrylate groups in a molecule.

Examples of the monofunctional monomers having one (meth)acrylate group in a molecule are tricyclodecane (meth)acrylate, dicyclopentadieneoxyethyl (meth)acrylate, dicyclopentanyl (meth)acrylate, isobornyl (meth)acrylate, adamantly (meth)acrylate, phenyloxyethyl (meth)acrylate, benzyl (meth)acrylate, tetrahydrofurfuryl (meth)acrylate, morpholine (meth)acrylate, phenylglycidyl (meth)acrylate, 2-hydroxyethyl (meth)acrylate, 2-hydroxypropyl (meth) acrylate, ethylcarbitol (meth)acrylate, dicyclopentenyloxyethyl acrylate, etc.

Examples of the (meth)acrylate monomers (C) having two or more (meth)acrylate groups in a molecule are neopentyl glycol di(meth)acrylate, tricyclodecanedimethylol di(meth) acrylate, hydroxypivalaldehyde-modified trimethylolpropane di(meth)acrylate, hydroxypivalic acid neopentylglycol di(meth)acrylate, polyethylene glycol di(meth)acrylate, dicyclopentanyl di(meth)acrylate, 1,6-hexanediol di(meth)acrylate, polypropylene glycol di(meth)acrylate, ethylene oxide-modified bisphenol A di(meth)acrylate, ethylene oxide-modified trimethylolpropane tri(meth)acrylate, ethylene oxide-modified pentaerythritol tetra(meth)acrylate, tris [(meth)acryloxyethyl]isocyanurate, ethylene oxide-modified dipentaerythritol hexa(meth)acrylate, etc.

These acrylate monomers may be used each alone or in admixture of two or more at an optional ratio. In the case of using the acrylate monomers, the content thereof in the resin composition of the present invention is usually 1-90% by weight, preferably 5-85% by weight.

The acrylate oligomers as the ethylenically unsaturated compound (C) include, for example, urethane (meth)acrylates having a molecular weight of 400-10000, and epoxy (meth)acrylates having a molecular weight of 500-10000.

The urethane (meth)acrylates having a molecular weight of 400-10000 are obtained by the reaction of the following polyhydric alcohol, an organic polyisocyanate and a hydroxyl (meth)acrylate compound.

Examples of the polyhydric alcohol are neopentyl glycol, 3-methyl-1,5-pentanediol, ethylene glycol, propylene glycol, 1,4-butanediol, 1,6-hexanediol, trimethylolpropane, pentaerythritol, tricyclodecanedimethylol, bis-[hydroxymethyl]-cyclohexane, etc.; polyester polyols obtained by the reaction of the above polyhydric alcohol with a polybasic acid (such as succinic acid, phthalic acid, hexahydrophthalic anhydride, terephthalic acid, adipic acid, azelaic acid, or tetrahydrophthalic anhydride); caprolactone alcohols obtained by the reaction of the above polyhydric alcohol with ε-caprolactone; polycarbonate polyols (such as polycarbonate diol obtained by the reaction of 1,6-hexanediol with diphenyl carbonate); polyethylene glycol, polypropylene glycol, polytetramethylene glycol, ethylene oxide-modified bisphenol A, and the like as polyether polyols.

Examples of the organic polyisocyanate are isophorone diisocyanate, hexamethylene diisocyanate, tolylene diisocynate, xylene diisocyanate, diphenylmethane-4,4'diisocyanate, dicyclopentanyl isocyanate, etc.

Examples of the hydroxy(meth)acrylate compound are hydroxtethyl (meth)acrylate, hydroxypropyl (meth)acrylate, hydroxybutyl (meth)acrylate, dimethylolcyclohexyl mono (meth)acrylate, hydroxycaprolactone (meth)acrylate, etc.

In the case of using the urethane (meth)acrylate having a molecular weight of 400-10000, the content thereof in the resin composition of the present invention is usually 1-90% by weight, preferably 3-85% by weight.

The epoxy (meth)acrylates having a molecular weight of 500-10000 are not particularly limited, and bisphenol type epoxy (meth)acrylates are preferred. Examples of the bisphenol type epoxy (meth)acrylates are bisphenol A type epoxy resins such as EPIKOTE 802, 1001 and 1004 manufactured by Yuka Shell Epoxy Co., Ltd. and epoxy (meth)acrylates obtained by the reaction of bisphenol F type epoxy resins such as EPIKOTE 4001P, 4002 and 4003P with (meth)acrylic acid. Furthermore, alicyclic epoxy (meth)acrylates obtained by hydrogenating the above epoxy (meth)acrylates may be used.

In the case of using the epoxy (meth)acrylate having a molecular weight of 500-10000, the content thereof in the resin composition of the present invention is usually 1-90% by weight, preferably 3-85% by weight.

If necessary, the resin composition of the present invention can contain polyester, polycarbonate, polyacrylic, polyurethane and polyvinyl resins as high polymers. Moreover, there may be used in combination additives such as organic solvent, silane coupling agent, polymerization inhibitor, leveling agent, light stabilizer, antioxidant, antistatic agent, surface lubricant and filler.

The resin composition of the present invention can be obtained by mixing and dissolving the above components at 20-80° C. with stirring, and thereafter the resulting composition may be filtered. The cured product of the present invention can be obtained by irradiating the resin composition of the present invention with light such as ultraviolet light or visible light by the following methods.

The resin composition of the present invention preferably has a viscosity of 100-5000 mPa·S at 25° C. measured by B-type viscometer.

The curing of the resin composition of the present invention by irradiation with light can be performed by using any light sources so long as they are lamps which irradiate lights of ultraviolet—near ultraviolet. For example, there may be used low pressure, high pressure and ultrahigh pressure mercury lamps, metal halide lamps, (pulse) xenon lamps, electrodeless lamps, etc.

It is preferred that the resin composition of the present invention is 6% or less in cure shrinkage when cured and 2.0% or less in water absorption of the cured product (measuring temperature: 25° C.). The cure shrinkage and water absorption here are measured by the methods described in the examples mentioned hereinafter.

The protective coating agent for optical disks using the resin composition of the present invention can be coated by any coating methods so long as it can be coated in a thickness of 50-100 μm. Examples of the coating methods are spin coating method, 2P method, roll coating method, screen printing method, etc.

For reading and/or writing of the next-generation high-density optical disks, a blue laser of approximately 400 nm is used. From this viewpoint, it is preferred that the cured product of 100±10 μm in thickness has a transmittance of 70% or higher for blue laser of 405 nm.

Furthermore, in the optical disk according to the present invention, a suitable construction is such that a cured product layer of the ultraviolet curable resin composition is provided on the side of incidence of recording light and/or reproducing light.

EXAMPLES

The present invention will be explained in detail using the following examples.

Synthesis Example 1 (A-1)

In a reaction vessel equipped with a reflux condenser, a stirrer, a thermometer and a temperature controller were charged 185.0 g of RE-310S (bisphenol A type epoxy resin having an epoxy equivalent of 185 g/equivalent; manufactured by Nippon Kayaku Co., Ltd.) (epoxy group: 1.0 mol equivalent) as an epoxy compound (a) having two or more epoxy groups in the molecule, 72.1 g (1.0 mol) of acrylic acid (molecular weight: 72.1) as a monocarboxylic acid compound (b) having an ethylenically unsaturated group in the molecule, and 0.773 g of 3,5-ditertiary butyl-4-hydroxytoluene as a thermal polymerization inhibitor, and the contents in the vessel were rendered homogeneous at 60° C. Then, 0.773 g of triphenylphosphine as a reaction catalyst was charged, and reaction was carried out at a temperature of 98° C. until the acid value of the reaction mixture reached 0.5 mg·KOH/g or less to obtain an epoxycarboxylate compound (c) (theoretical molecular weight: 514.1).

Then, the reaction mixture was kept at 50° C., and 78.4 g of MEK (2-butanone) was charged as a reaction solvent, 0.157 g of dibutyltin dilaurate was charged as an urethanation reaction catalyst, 55.6 g (0.25 mol) of isophorone diisocyanate (molecular weight: 222.3) as a diisocyanate compound (d) was charged by dropping to the reaction mixture over a period of 3 hours, and the reaction was continued at a reaction temperature of 70° C. until the NCO content reached 0.1% or less. As a result, there was obtained a solution containing 80% of a polyurethane compound (A-1) of the present invention (Mw=6,000 (in terms of polystyrene and measured by GPC)).

Synthesis Example 2 (A-2)

In a reaction vessel equipped with a reflux condenser, a stirrer, a thermometer and a temperature controller were charged 112.3 g (0.3 mol) of R-167 (aliphatic epoxy acrylate, theoretical molecular weight: 374.4; manufactured by Nippon Kayaku Co., Ltd.) as an epoxy carboxylate compound (c) obtained by reacting an epoxy compound (a) having two or more epoxy groups in the molecule with a monocarboxylic acid compound (b) having an ethylenically unsaturated group in the molecule, 0.073 g of 4-methoxyphenol as a thermal polymerization inhibitor, and 0.073 g of dibutyltin dilaurate as an urethanation reaction catalyst, and the contents in the vessel were kept at 50° C.

Then, 33.4 g (0.15 mol) of isophorone diisocyanate (molecular weight: 222.3) as a diisocyanate compound (d) was charged by dropping over a period of 3 hours, and the reaction was continued at a reaction temperature of 70° C. until the NCO content reached 0.1% or less. As a result, there was obtained a polyurethane compound (A-2) of the present invention (Mw=3,500 (in terms of polystyrene and measured by GPC)).

Synthesis Example 3 (A-3)

In a reaction vessel equipped with a reflux condenser, a stirrer, a thermometer and a temperature controller were charged 112.3 g (0.3 mol) of R-167 (aliphatic epoxy acrylate, theoretical molecular weight: 374.4; manufactured by Nippon Kayaku Co., Ltd.) as an epoxy carboxylate compound (c) obtained by reacting an epoxy compound (a) having two or more epoxy groups in the molecule with a monocarboxylic acid compound (b) having an ethylenically unsaturated group in the molecule, 0.078 g of 4-methoxyphenol as a thermal polymerization inhibitor, and 0.078 g of dibutyltin dilaurate as an urethanation reaction catalyst, and the contents in the vessel were kept at 50° C.

Then, 44.5 g (0.20 mol) of isophorone diisocyanate (molecular weight: 222.3) as a diisocyanate compound (d) was charged by dropping over a period of 3 hours, and the reaction was continued at a reaction temperature of 70° C. until the NCO content reached 0.1% or less. As a result, there was obtained a polyurethane compound (A-3) of the present invention (Mw=5,200 (in terms of polystyrene and measured by GPC)).

Synthesis Example 4 (A-4)

In a reaction vessel equipped with a reflux condenser, a stirrer, a thermometer and a temperature controller were charged 185.0 g of EPIKOTE 828 (bisphenol A type epoxy resin having an epoxy equivalent of 185 g/equivalent; manufactured by Japan Epoxy Resin Co., Ltd.) (epoxy group: 1.0 mol equivalent) as an epoxy compound (a) having two or more epoxy groups in the molecule, 72.1 g (1.0 mol) of acrylic acid (molecular weight: 72.1) as a monocarboxylic acid compound (b) having an ethylenically unsaturated group in the molecule, and 0.773 g of 3,5-ditertiary butyl-4-hydroxytoluene as a thermal polymerization inhibitor, and the contents in the vessel were rendered homogeneous at 60° C. Then, 0.773 g of triphenylphosphine was charged as a reaction catalyst, and reaction was carried out at 98° C. until acid value of the reaction mixture reached 0.5 mg·KOH/g or less to obtain an epoxycarboxylate compound (c) (theoretical molecular weight: 514.1).

Then, the reaction mixture was kept at 50° C., and 140 g of 1,6-hexanediol diacrylate was charged as a reactive diluent, 0.157 g of dibutyltin dilaurate was charged as an urethanation reaction catalyst, 55.5 g (0.33 mol) of hexamethylene diisocyanate (molecular weight: 168.2) as a diisocyanate compound (d) was charged by dropping over a period of 3 hours, and the reaction was continued at a reaction temperature of 70° C. until the NCO content reached 0.1% or less. As a result, there was obtained a polyurethane compound (A-4) of the present invention.

Comparative Synthesis Example (H-1)

In a reaction vessel equipped with a reflux condenser, a stirrer, a thermometer and a temperature controller were charged 101.0 g (OH: 0.22 mol equivalent) of a mixture of pentaerythritol triacrylate and pentaerythritol tetracrylate (mixing ratio in part by weight: 65/35, hydroxyl group equivalent: 458.9 Eq), 0.067 g of 4-methoxyphenol as a thermal polymerization inhibitor, and 0.067 g of dibutyltin dilaurate as an urethanation reaction catalyst, followed by stirring at 70° C. until the reaction mixture became homogeneous, and 17.8 g (NCO: 0.16 mol equivalent) of isophorone diisocyanate was dropped over a period of 3 hours. After completion of dropping, the reaction was carried out at 70° C., and when the NCO content reached 0.1% or less, the reaction was terminated to obtain a comparative polyurethane compound (H-1) (Mw=1,000 (in terms of polystyrene and measured by GPC)).

Examples 1-3 and 7, and Comparative Example 1

Resin compositions were prepared with the compositions as shown in Table 1 using the polyurethane compound (A-1) obtained in Synthesis Example 1 from which the solvent MEK was previously evaporated to obtain only the resin content, and using (A-2), (A-3), (A-4) and (H-1) as they were. A wall was made with a gum tape (thickness: 200 μm) on a stainless steel plate and thereon the resin composition was coated by a bar coater, and the coat was irradiated with ultraviolet light from a lamp provided at a height of 10 cm at a carrying rate of 5 m/min in a nitrogen atmosphere to obtain a cured film of about 200 μm in thickness.

TABLE 1

| Amount (g) | Example | | | | Comparative Example 1 |
|---|---|---|---|---|---|
| | 1 | 2 | 3 | 7 | |
| (A-1) | 80 | | | | |
| (A-2) | | 80 | | | |
| (A-3) | | | 80 | | |
| (A-4) | | | | 80 | |
| (H-1) | | | | | 80 |

TABLE 1-continued

|  | Example | | | | Comparative |
|---|---|---|---|---|---|
| Amount (g) | 1 | 2 | 3 | 7 | Example 1 |
| HDDA*1 | 20 | 20 | 20 | 20 | 20 |
| Irg. 184*2 | 5 | 5 | 5 | 5 | 5 |

*1HDDA; 1,6-hexanediol diacrylate manufactured by Nippon Kayaku Co., Ltd.
*2Irg. 184 (IRGACURE 184); 1-hydroxycyclohexylphenyl ketone manufactured by Ciba Specialty Chemicals Inc.

Test Examples

The following properties of the films obtained in the above Examples and Comparative Example were evaluated by the following methods, and the results are shown in Table 2.

(Pencil Hardness)

Pencil hardness of the coat film was measured by scratching with a pencil in accordance with JIS K 5400 (unit: H, and the higher the value obtained, the higher the hardness). That is, the film to be measured was scratched in a length of about 5 mm with a pencil at an angle of 45° under a load of 1 kg applied from above, and the state of scratch marks was examined.

(Tensile Test)

The film was cut to a size of 1.0 cm×4.0 cm, and the following data were measured using Tensilon.
1: Young's modulus
2: Stress at break
3: Elongation at break

TABLE 2

|  | Pencil hardness | Young's modulus (MPa) | Stress at break (MPa) | Elongation at break (%) |
|---|---|---|---|---|
| Example 1 | 3H | 1076 | 26.6 | 3.3 |
| Example 2 | H | 1000 | 35.4 | 7.0 |
| Example 3 | 2H | 1197 | 34.8 | 7.2 |
| Example 7 | 2H | 1939 | 57.6 | 3.8 |
| Comparative Example 1 | 6H | 1070 | 17.8 | 2.0 |

It can be seen from the results shown in Table 2 that the photosensitive resin compositions of the present invention give tough films which can elongate with maintaining surface curability and high young's modulus and stress at break.

Furthermore, resin compositions as shown in the following table were prepared using the compounds (A-2) and (A-4) obtained in Synthesis Examples 2 and 4, and the following evaluations were conducted and the results are shown in Table 3. The "part" in Table 3 is "part by weight". Evaluations of the properties were conducted by the following methods.

(Viscosity)

The viscosity measured by B-type viscometer (measured at 25° C. in accordance with JIS K-7117) is taken as standard.

(Cure Shrinkage)

The cure shrinkage is a value calculated by the following formula (1) from the liquid specific gravity at 25° C. before curing and the film specific gravity at 25° C. obtained by curing.

$$\text{Cure shrinkage} = \left(\frac{\text{film specific gravity} - \text{liquid specific gravity}}{\text{film specific gravity}}\right) \times 100 \quad (1)$$

(Water Absorption)

This is obtained by the method in accordance with JIS K-7209 7.2.1.

(Transmittance)

The resin is coated at a thickness of 100±10 μm on a polycarbonate substrate by spin coating and cured with UV, and thereafter a transmittance for blue laser of 405 nm is measured using the polycarbonate substrate as a reference.

(Warpage)

A DVD substrate sputtered with aluminum is used. The composition shown in Table 1 is coated on the aluminum-sputtered DVD substrate by a spin coater to form a coat of 100 μm in average thickness. The coat is cured with an amount of energy in an integrated light volume of 1000 mJ/cm² by an UV irradiator (CS-30L manufactured by Japan Storage Battery Co., Ltd.; 80 w/cm high pressure mercury lamp) in which the lamp is set at a height of 10 cm. The resulting test piece is left to stand for 24 hours and then put on a glass plate to conduct evaluation on warpage.

◯: Substantially no warpage is seen.

Δ: When one side of the test piece is pressed with a finger, another side is raised by less than 2 mm.

X: When one side of the test piece is pressed with a finger, another side is raised by 5 mm or more.

(Durability)

The test piece used in the evaluation of warpage is left to stand under an environment of 80° C. and 85% RH for 500 hours. The state of the reflective film is visually observed.

◯: No change is seen in the reflective film all the time just after coating.

Δ: Some discoloration or pin holes are seen in the reflective film.

X: Much discoloration or many pin holes are seen in the reflective film.

TABLE 3

|  | Example 4 | Example 5 | Example 6 | Example 8 | Example 9 | Comparative Example 2 |
|---|---|---|---|---|---|---|
| Component (A) (part) | | | | | | |
| A-2 | 50 | 50 | 70 | | | |
| A-4 | | | | 40 | 40 | |
| UX-6101 | | | | | | 20 |
| Component (C) (part) | | | | | | |
| R-684 | 35 | | | 45 | 35 | |
| R-604 | | 30 | | | | 70 |
| PHE | 15 | | | 15 | | 10 |

TABLE 3-continued

|  | Example 4 | Example 5 | Example 6 | Example 8 | Example 9 | Comparative Example 2 |
|---|---|---|---|---|---|---|
| FA-512A |  |  |  |  | 25 |  |
| LA |  | 20 | 30 |  |  |  |
| Component (B) (part) |  |  |  |  |  |  |
| IRGACURE 184 | 5 | 5 | 5 | 5 | 5 | 5 |
| Properties |  |  |  |  |  |  |
| Viscosity (mPa · S/25° C.) | 3200 | 2700 | 2900 | 2695 | 2875 | 2100 |
| Cure shrinkage (%) | 4.6 | 4.5 | 4.3 | 5.8 | 5.3 | 7.2 |
| Water absorption (%) | 1.0 | 1.0 | 0.8 | 0.9 | 0.8 | 1.6 |
| Transmittance (%) | 80 | 80 | 80 | 80 | 80 | 80 |
| Warpage | ○ | ○ | ○ | ○ | ○ | X |
| Durability | ○ | ○ | ○ | ○ | ○ | ○ |

The abbreviations of the components in the above table are as follows.
UX-6101: Polyester-type urethane acrylate (molecular weight; 2700 ± 500) manufactured by Nippon Kayaku Co., Ltd.
R-684: Dicyclopentanyl di(meth)acrylate manufactured by Nippon Kayaku Co., Ltd.
R-604: Hydroxypivalaldehyde-modified trimethylolpropane di(meth)acrylate manufactured by Nippon Kayaku Co., Ltd.
PHE: Phenoxyethyl (meth)acrylate manufactured by Daiichi Kogyo Seiyaku Co., Ltd.
FA-512A: Dicyclopentenyloxyethyl acrylate manufactured by Hitachi Chemical Co., Ltd.
LA: Lauryl acrylate manufactured by Nippon Oil & Fats Co., Ltd.
IRGACURE-184: 1-Hydroxycyclohexylphenyl ketone manufactured by Ciba Specialty Chemicals Inc. (photopolymerization initiator)

It can be seen from the results of Table 3 that the present invention can provide resin compositions as protective coating agents for high-density optical disks and cured products of the compositions which are excellent in transparency and low absorption, less in warpage and have high durability, and the compositions are very useful for optical disks readable and/or writable using blue laser.

Furthermore, ultraviolet curable resin compositions of Example 10 and Comparative Example 3 were prepared using compound A-4 obtained in Synthesis Example 4 and experiments were conducted to confirm characteristics as adhesives for DVD and HD DVD.

A substrate sputtered with silver alloy in 20 nm as a translucent reflective film and a substrate sputtered with aluminum in 50 nm as a total reflective film were used for a two-layer DVD-ROM substrate to which a pit was previously transferred. Each of the ultraviolet curable composition of Example 10 and Comparative Example 3 was sandwiched between the surfaces of the two different reflective films so as to give a thickness of 45 μm by spin coating, followed by irradiation with light of 1000 mJ/cm² from a metal halide lamp from the side of the translucent reflective film to carry out adhesion by curing to obtain a 2-layer DVD for test.

These 2-layer DVDs were evaluated on the following properties, and the results are shown in Table 4. The "part" in the table is "weight part". Ultraviolet curable resin compositions as shown in Table 4 were prepared by conventional process. Evaluation of the properties were conducted by the following methods.

(Durability)

The DVD was left to stand under an environment of 80° C. and 85% RH for 96 hours, and then at room temperature for 24 hours. Evaluation of durability of DVD was conducted by measuring PISum8 at the three points of 24 mm, 38 mm, 56 mm in radius of the silver alloy reflective layer of the disk using DVDCATS SA3000 (manufactured by Audio Dev Co., Ltd.) as a tester, and the average value was used as a measured value. Moreover, using the measured value, the increment of PI was calculated by the following formula.

Increment of PI=(the measured value after left to stand at 80° C. and 85% RH for 96 hours)−(the measured value just after adhesion)

In the present invention, the increment of PI by 100 or less was judged to be acceptable.

(Light Resistance)

DVD was placed under a fluorescent lamp at a distance of 10 cm with the silver alloy side of the DVD facing the fluorescent lamp, and was left to stand for 1 week. Evaluation of light resistance of the DVD was conducted by measuring R14H (reflectance) at the three points of 24 mm, 38 mm, 56 mm in radius of the silver alloy reflective layer of the disk using DVDCATS SA3000 (manufactured by Audio Dev Co., Ltd.) as a tester, and the average value obtained was used as a measured value. Moreover, using the measured value, the decrement of reflectance was calculated by the following formula.

Decrement of reflectance=(the measured value after left to stand for 1 week)−(the measured value just after adhesion)

In the present invention, decrease of reflectance by −4% or more was judged to be acceptable.

TABLE 4

|  | Example 10 | Comparative Example 3 |
|---|---|---|
| Component (A) (part) |  |  |
| A-2 |  | 40 |
| A-4 | 35 |  |
| Component (C) (part) |  |  |
| HDDA | 20 | 20 |
| SR306H | 40 | 35 |
| Component (B) (part) |  |  |
| IRGACURE 184 | 4 | 4 |
| LUCIRIN TPO | 1 | 1 |
| Properties |  |  |
| Viscosity (mPa · S/25° C.) | 408 | 405 |
| Durability (increment of PI error) | 12 | 328 |

TABLE 4-continued

|  | Example 10 | Comparative Example 3 |
|---|---|---|
| Light resistance (decrement of reflectance) | −1% | −8% |
| Overall judgment | Acceptable | Unacceptable |

SR306H: Tripropylene glycol diacrylate (manufactured by Sartomer Co., Ltd.)
LUCIRIN TPO: 2,4,6-Trimethylbenzoyldiphenylphosphine oxide (manufactured by BASF Co., Ltd.)

Comparison of Example 10 with Comparative Example 3 reveals that properties of DVD of Example 10 using A-4 as the component (C) were superior in the durability test and light resistance test. Furthermore, from the result, it can be seen that the cured products of the present invention are useful not only for DVD, but also for HD DVD using blue laser.

INDUSTRIAL APPLICABILITY

The resin composition and cured product thereof of the present invention give mainly a protective coating agent for optical disks and the cured product thereof, and besides they can be applied to the materials relating to optical uses such as adhesives for lamination of DVD and HD DVD, 2p agent, optical fibers, and optical switching elements.

The invention claimed is:

1. An optical disk having a layer of a cured product produced by curing a resin composition, wherein said resin composition comprises: a polyurethane compound (A) produced by reacting an epoxycarboxylate compound (c) with a diisocyanate compound (d), said compound (c) being produced by reacting an epoxy compound (a) having two or more epoxy groups in a molecule with a monocarboxylic acid compound (b) having an ethylenically unsaturated group in a molecule; a photopolymerization initiator (B); and an ethylenically unsaturated compound (C) other than the compound (A).

2. The optical disk according to claim 1, wherein the epoxy compound (a) having two or more epoxy groups in a molecule is a bisphenol A epoxy resin, and the monocarboxylic acid compound (b) having an ethylenically unsaturated group in a molecule is acrylic acid.

3. The optical disk according to claim 1 or 2, wherein the diisocyanate compound (d) is at least one compound selected from the group consisting of hexamethylene diisocyanate, 2,2,4-trimethylhexamethylene diisocyanate and 2,4,4-trimethylhexamethylene diisocyanate.

4. The optical disk according to claim 1 or 2, wherein said resin composition is a protective coating agent for said optical disk.

5. The optical disk according to claim 1, wherein said layer of the cured product has a water absorption measured at 25° C. of 2.0% or less and a cure shrinkage of 6% or less.

6. The optical disk according to claim 1, wherein said layer of the cured product has a transmittance of 70% or higher for blue laser having a wavelength of 405 nm at a film thickness of 100±10 μm of the layer of the cured product.

7. The optical disk according to claim 1, wherein said optical disk has a recording light and/or reproducing light incidence side, and wherein said layer of the cured product is on said incidence side.

8. The optical disk according to claim 3, wherein said resin composition is a protective coating agent for said optical disk.

* * * * *